Dec. 2, 1924.  
F. L. MARTINEAU  
1,517,372  
INTERNAL COMBUSTION ENGINE  
Filed June 29, 1920  
2 Sheets-Sheet 1

Dec. 2, 1924.

F. L. MARTINEAU 1,517,372

INTERNAL COMBUSTION ENGINE

Filed June 29, 1920.   2 Sheets—Sheet 2

Patented Dec. 2, 1924.

1,517,372

UNITED STATES PATENT OFFICE.

FRANCIS LEIGH MARTINEAU, OF LONDON, ENGLAND.

INTERNAL-COMBUSTION ENGINE.

Application filed June 29, 1920. Serial No. 392,787.

*To all whom it may concern:*

Be it known that I, FRANCIS LEIGH MARTINEAU, a subject of the King of Great Britain, and resident of London, England, have invented certain new and useful Improvements in and Relating to Internal-Combustion Engines, of which the following is a specification.

This invention relates to internal combustion engines and has reference to that class of engine where steam or other elastic fluid preferably generated by the waste heat of combustion is used expansively at the back or backs of the combustion engine piston or pistons.

The object of the invention is to provide a compact and efficient engine of comparatively simple construction and capable of manufacture in small as well as large sizes.

Important advantages possessed by the invention are that the steam clearance space is reduced to a minimum and there is no possibility of the combustion gases leaking through to the steam side of the piston.

The invention consists broadly of an engine having a hollow piston sliding relatively to a fixed abutment within it through which the steam is introduced to a steam space within the hollow piston and located between the fixed abutment and the closed end of the hollow piston, the combustion chamber being located in the combustion cylinder within which the hollow piston slides, on the other side of this closed end of the hollow piston.

In the preferred construction each cylinder is enclosed in a boiler drum or jacket within which a waste heat generator is disposed, through which the exhaust combustion gases are led prior to their final exhaust, the steam generated in this boiler drum or jacket being used expansively at the backs of the combustion engine pistons.

In the accompanying drawings I have illustrated an embodiment of the invention. In these drawings:—

Figure 1:
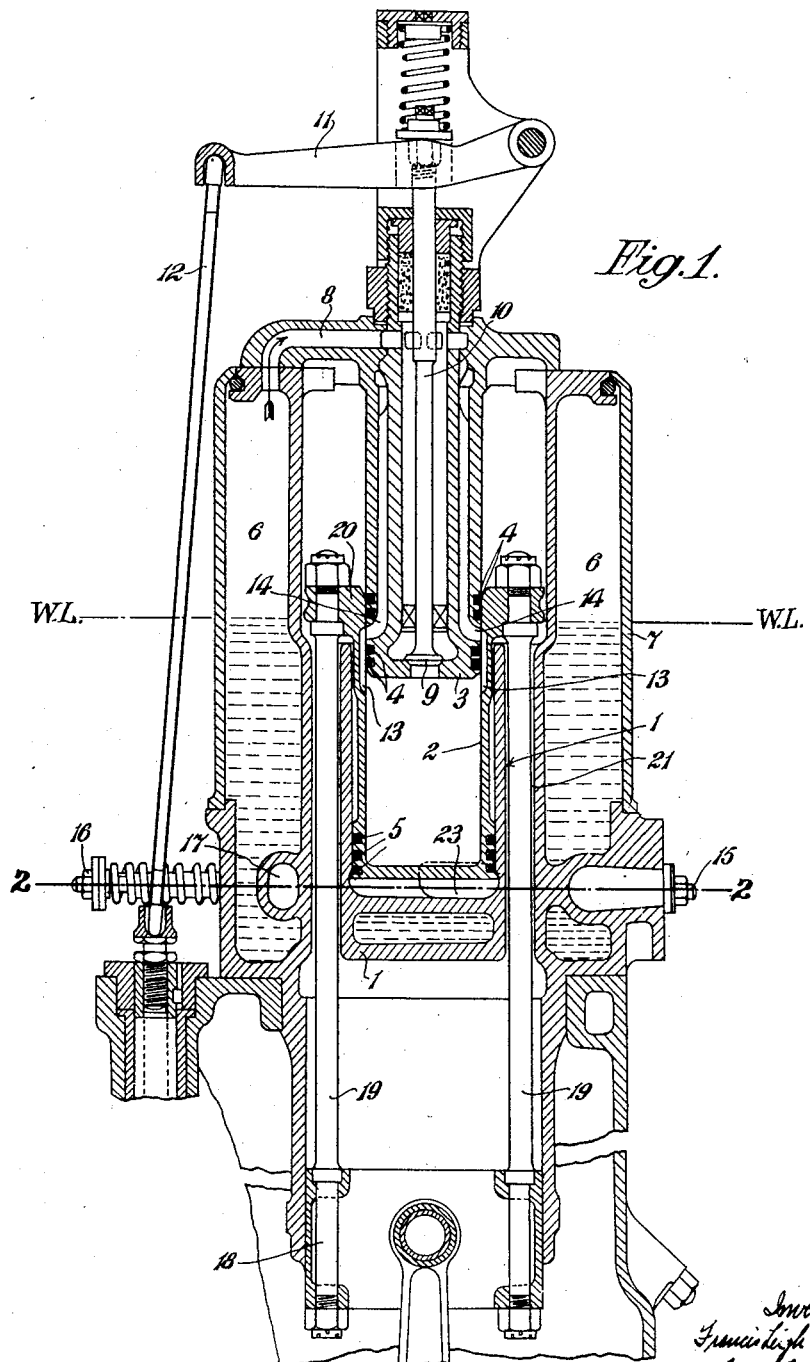
Fig. 1 is a sectional elevation of the cylinder, steam generator and piston showing connecting rods, crosshead and crank shaft.

Referring to both figures, 1 is the cylinder of my engine, 2 is the hollow piston, 3 is a fixed abutment which constitutes the cylinder head. This abutment is provided with piston rings 4 which keep it in steam tight engagement with the inside of the piston 2. other piston rings 5 keeping the outside of the piston in gas-tight engagement with the cylinder 1. The space between the fixed abutment 3 and the inside of the piston 2 will constitute the steam cylinder: and the space between the end of the cylinder 1 and the outside of the piston 2, the combustion cylinder of my engine, and the parts should be so designed and assembled that the smallest possible clearance between 2 and 3 remains when the piston 2 is at the top of its stroke. The space 6 surrounding the cylinder 1 and enclosed by the cylindrical drum or jacket 7 constitutes the steam generator and is kept filled with water up to about the line WL. From this space 6 steam is conveyed into the hollow interior of the fixed abutment 3 by the steam inlet port 8. its admission into the steam cylinder being controlled by the valve 9, the valve rod 10 of which is connected by a lever 11 to a cam rod 12, which is actuated by a suitably driven cam (not shown) in well known manner.

When the steam stroke is almost completed the lower edges of the recesses 13 in the inner wall of the hollow piston 2 clear the bottom of the fixed abutment 3 and the steam is free to exhaust by means of exhaust ports 14 provided in the said fixed abutment.

Figure 2:
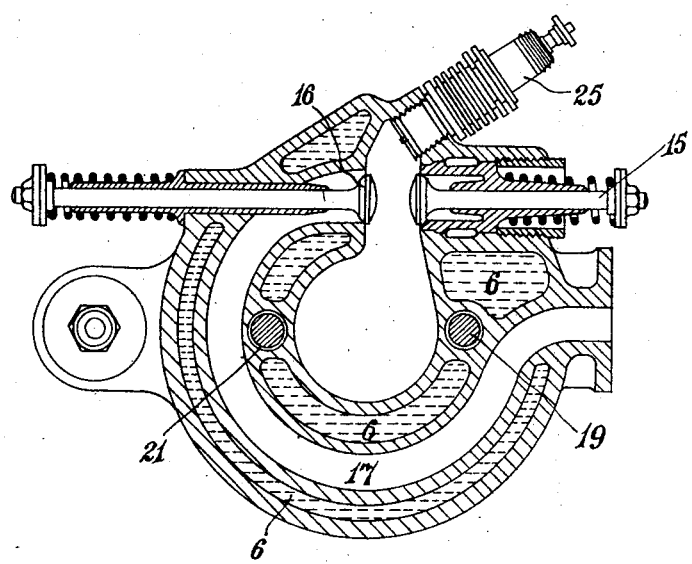
Fig. 2 is a section through the line 2—2 of Fig. 1.

Regarding the combustion cylinder of my engine, the operations of admission, ignition and exhaust may be controlled by any familiar means, such for instance, as the cam controlled inlet and exhaust valves 15 and 16 shown in Fig. 2. The products of combustion upon exhaust are conducted, by means of passage 17, through the steam generator before passing into the atmosphere.

Power is transmitted from the piston 2 to the engine crosshead 18 by means of two connecting rods 19 which are bolted to lugs 20 cast on the upper end of the hollow piston 2. passages 21 in the cylinder casting allowing the said connecting rods to pass freely to the crosshead 18.

It will be realized from the foregoing that in operation the combustion stroke takes place in the combustion cylinder moving the piston in one direction. After the combustion stroke the exhaust gases pass through the port 23, through the waste heat generator as before indicated, and a cam operates to open the steam inlet valve 9 and steam passes from within the fixed abutment 3 to the steam space between the latter and the end of the hollow piston 2, and operating expansively moves the piston in the other direction. When the recesses 13 aforesaid in the inner wall of the hollow piston 2 pass beyond the lower end of the fixed abutment 3, the steam exhausts from the steam space to this recess and thence to the steam exhaust pipe 14. Of course the return stroke of the piston compresses a fresh charge in the combustion cylinder 1, which is then fired either by a sparking plug 25 or in any suitable well known manner. As before observed it will be seen that with the foregoing construction steam clearance spaces are practically eliminated. Moreover the steam and combustion sides are separated and there is no tendency for the combustion gases or lubrication to leak past the piston into the steam space. Further, the arrangement provides for adequate cooling of the piston by the steam which enters within it as before described. Steam for the steam stroke may be provided solely by the waste heat from the cylinder walls and exhaust gases. An engine of the foregoing character will be capable of developing considerable overload power and will moreover possess the advantage of a high degree of flexibility.

What I claim and desire to secure by Letters Patent is:—

An internal combustion engine, comprising a cylinder, a fixed and hollow abutment projecting into and in spaced relation to the open end of an inverted cylinder, a hollow piston the inside of which is in gas-tight sliding engagement with the fixed abutment and the outside of which is in gas-tight sliding engagement with the cylinder, a boiler surrounding said cylinder and adapted to be heated by the waste heat from the engine and the exhaust gases, means connecting the top of said boiler to the interior of the fixed hollow abutment for admitting thereto the steam generated in said boiler, a port in the lower end of said fixed abutment, a valve controlling said port the stem of which extends up through the center of said abutment and out through the upper end of the same, means for mechanically operating said valve so as to admit steam to the interior of the hollow piston, longitudinal grooves in the inside periphery of the piston adapted to coact with passages in the fixed abutment so as to control the exhausting of the steam from the interior of the piston, and valves controlling the admission of fuel to, and the exhaust of the products of combustion from, the space between the cylinder and the end of the piston.

In witness whereof I affix my signature.

FRANCIS LEIGH MARTINEAU.